(12) United States Patent
Utsunomiya et al.

(10) Patent No.: US 6,226,256 B1
(45) Date of Patent: May 1, 2001

(54) OPTICAL RECORDING DISC HAVING SYNCHRONIZATION MARK PATTERN AND METHOD OF ITS RECORDING AND REPRODUCTION

(75) Inventors: Hajime Utsunomiya; Tatsuya Kato, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/283,865

(22) Filed: Apr. 1, 1999

(30) Foreign Application Priority Data

Apr. 3, 1998 (JP) ................................................ 10-108680

(51) Int. Cl.[7] ...................................................... G11B 7/24
(52) U.S. Cl. ...................................... 369/275.3; 428/64.4
(58) Field of Search .................................... 369/275.3, 14, 369/275.2, 275.1, 273, 272, 280, 282, 275.5; 428/64.1, 64.4; 430/270.13

(56) References Cited

U.S. PATENT DOCUMENTS

| | | | |
|---|---|---|---|
| 4,672,600 | * 6/1987 | Balston et al. | 369/275.3 |
| 5,150,339 | * 9/1992 | Ueda et al. | 369/32 |
| 5,287,335 | * 2/1994 | Ichiyama | 369/13 |
| 5,617,380 | * 4/1997 | Holmstrom | 369/14 |
| 5,661,703 | * 8/1997 | Moribe et al. | 369/14 |
| 5,751,671 | * 5/1998 | Koike et al. | 369/14 |
| 5,812,501 | * 9/1998 | Moribe et al. | 369/14 |
| 5,822,291 | * 10/1998 | Brindze et al. | 369/94 |
| 5,886,979 | * 3/1999 | Moribe et al. | 369/275.3 |
| 5,978,322 | * 11/1999 | Sugimoto et al. | 369/14 |

FOREIGN PATENT DOCUMENTS

| | | |
|---|---|---|
| 56-25242 | 3/1981 | (JP) . |
| 9-73666 | 3/1997 | (JP) . |

\* cited by examiner

Primary Examiner—Tan Dinh
(74) Attorney, Agent, or Firm—Oblon, Spivak, McClelland, Maier & Neustadt, P.C.

(57) ABSTRACT

Formation of a synchronization mark pattern of excellent readability is enabled in an optical recording disc wherein track jump is required once per one disc rotation in a convenient manner. The optical recording disc comprises a disc substrate 2 and a recording layer 4 on the disc substrate 2, and at least one surface-irregularity region 2b having an irregularity pattern formed therein is provided on the substrate in its non-recording region and circumferentially adjacent to a smooth region. The surface-irregularity region is preferably in the shape of an arc concentric with the substrate, and the surface-irregularity region preferably comprises a plurality of circumferentially extending grooves or a plurality of projections.

16 Claims, 1 Drawing Sheet

OPTICAL RECORDING DISC HAVING SYNCHRONIZATION MARK PATTERN AND METHOD OF ITS RECORDING AND REPRODUCTION

BACKGROUND OF THE INVENTION

1. Field of Invention

This invention relates to an optical recording disc and a method for recording and reproducing such an optical recording disc.

2. Discussion of the Background

Highlight is recently focused on optical recording media capable of recording information at a high density and erasing the recorded information for overwriting. For example, Specification (Ver. 1.0) for DVD-RAM which is a phase change optical recording disc was published in July, 1997. A phase change optical recording medium is a medium wherein a laser beam is directed to the recording layer to change its crystalline state whereupon a change of reflectance by the crystallographic change is detected for reproduction of the information. The phase change optical recording media are of great interest since the optical system of the drive unit used for their operation is simple as compared with magneto-optical recording media.

When information is recorded in the optical recording medium of phase change type, the laser beam applied is of high power (recording power) that the recording layer is heated to a temperature higher than the melting point. In the region where the recording power is applied, the recording layer is melted and thereafter quenched to form an amorphous record mark. When the record mark is erased, a laser beam of relatively low power (erasing power) is applied so that the recording layer is heated to a temperature higher than the crystallizing temperature and lower than the melting temperature. The record mark to which the laser beam of erasing power is applied is heated to a temperature higher than the crystallizing temperature and then allowed to slowly cool to recover the crystalline state. Accordingly, in the optical recording media of the phase change type, the medium can be overwritten by modulating the intensity of a single laser beam.

Phase change-type optical recording discs which found relatively widespread use include PD and CD-RW. These optical recording discs are of the format wherein a spiral guide groove (which is hereinafter referred to as a groove) formed on the surface of the substrate is used for the recording track. In such disc, the recording track is continuous, and jump of optical pickup is not required even when the information is continuously recorded and reproduced in two or more turns of the recording tracks.

Recently, so-called land/groove recording wherein land (the region between two adjacent grooves) in addition to the groove is used for the recording track in order to increase the recording density has gone into practical use. When a disc having a single spiral groove is recorded by such land/groove recording, the recording track will be discontinuous, and the optical pickup is required to jump to the next track, namely, the adjacent land or groove once per one rotation of the disk. Such jumping to the adjacent recording track is herein referred to as a track jump.

Therefore, it is general in the optical recording disc for land/groove recording to preform a synchronization mark pattern (typically a pit train) in the land or groove of the substrate so that the optical pickup can read such pattern to effect the track jump. Such synchronization mark pattern may be formed in the disc substrate simultaneous with the injection molding of the disc, and for such simultaneous formation of the pattern, a pit train-forming pattern may formed in the stamper which functions as the mold in the injection molding. Production of such stamper adapted for simultaneous formation of the pit train in the groove or on the land, however, is quite difficult since track pitch has been reduced with the increase in the recording density, and formation of an accurate pattern is difficult. Such difficulty has been reflected on the track jump error.

SUMMARY OF THE INVENTION

An object of the present invention is to enable a convenient formation of a highly readable synchronization mark pattern indicative of the track jump position in an optical recording disc wherein track jump is required once per one disc rotation.

Such an object is realized by the constitution of any one of (1) to (7), below.

(1) An optical recording disc comprising a disc substrate and a recording layer on the disc substrate, wherein at least one surface-irregularity region having an irregularity pattern is formed on the substrate in its non-recording region, and said surface-irregularity region is circumferentially adjacent to a smooth region.

(2) An optical recording disc according to the above (1) wherein said surface-irregularity region is in the form of an arc which is concentric with the substrate.

(3) An optical recording disc according to the above (1) or (2) wherein said irregularity pattern includes a plurality of circumferentially extending grooves.

(4) An optical recording disc according to any one of the above (1) to (3) wherein said irregularity pattern includes a plurality of projections.

(5) An optical recording disc according to any one of the above (1) to (4) wherein said surface-irregularity region has radial width of at least 1 mm.

(6) An optical recording disc according to any one of the above (1) to (5) wherein said substrate is formed with grooves and/or pits in its data recording region, and said surface-irregularity pattern has a depth or height substantially equal to groove or pit.

(7) An optical recording disc according to any one of the above (1) to (6) wherein said disc has a recording layer of phase change type, and wherein said recording layer in its crystalline state covers said surface-irregularity region and said smooth region.

(8) An optical recording disc according to any one of the above (1) to (7) wherein said disc has a reflective layer, and wherein said reflective layer covers said surface-irregularity region and said smooth region.

(9) A method for recording and reproducing an optical recording disc according to anyone of any one of the above (1) to (8) wherein track jump is conducted in synchronicity with change of reflectance in said surface-irregularity region induced by the disc rotation.

DETAILED DESCRIPTION OF THE INVENTION

Figure 1:
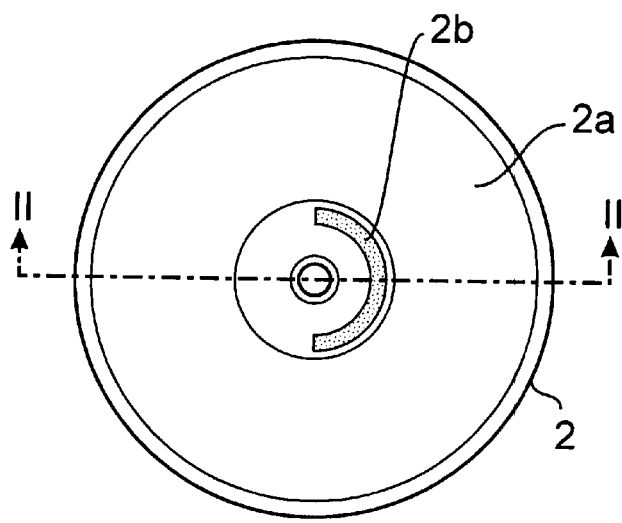
FIG. 1 is a plan view of an embodiment of the optical recording disc according to the present invention.
Figure 2:
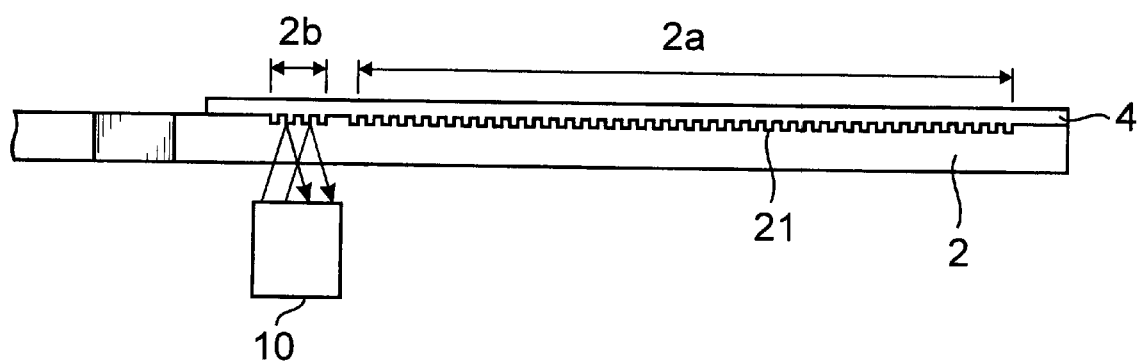
FIG. 2 is a magnified cross-sectional view of the optical recording disc of FIG. 1 taken along lines II—II.

An embodiment of the optical recording disc of the present invention is shown in FIG. 1, and the cross-section of this optical recording disc taken along lines II—II is shown in magnified view in FIG. 2. This optical recording disc has a recording layer 4 formed on one surface of the disc substrate 2. The recording layer 4 covers the substrate from its inner peripheral region to its outer peripheral region except for the innermost region. The substrate 2 has a data recording region 2a formed with a groove 21 to enable the land/groove recording.

The region formed with no groove 21 is the region where no data is recorded, and this region is referred herein as the non-recording region. The non-recording region is present both in the outer peripheral region and in the inner peripheral region, and the non-recording region in the inner peripheral region has an arc-shaped surface-irregularity region 2b concentrically formed with the substrate 2. The surface-irregularity region 2b is the region wherein an irregularity pattern comprising a plurality of ridges and grooves is formed on the surface of the substrate 2.

The mechanism of the recording and the reproduction of such optical recording disc is described by referring to FIG. 2. As shown in FIG. 2, a sensor for reflected light 10 is located in the back side of the optical recording disc opposite the surface-irregularity region 2b to thereby detect change in reflectance of the recording layer 4. The reflected light sensor 10 is of the constitution comprising a light emitting diode (LED) and a photodiode (PD). When the optical recording disc located as described above is rotated, the reflected light sensor 10 will alternately irradiate the surface-irregularity region 2b and the smooth region circumferentially adjacent to the surface-irregularity region 2b. Since the light beam emitted from the reflected light sensor 10 is inconsistent in its phase, and the diameter of the beam spot is incommensurably larger than the dimension of the grooves and/or the projections of the irregularity pattern, the light is irregularly reflected in the surface-irregularity region 2b. On the other hand, the surface is smooth in the non-recording region other than the surface-irregularity region 2b, and the reflectance of such smooth region is different from that of the surface-irregularity region 2b. As a consequence, the reflectance changes once in half rotation. By detecting such change in the reflectance and performing a predetermined signal processing, for example, to identify the time of the rise or fall of the reflectance, stable signals are reliably obtained in synchronization with the rotation. When the recording is effected by conducting the track jump in synchronization with the thus obtained signal, track jump at correct timing is realized.

In the embodiment shown in FIG. 1, the surface-irregularity (concave·convex) region 2b is in the form of an arc with a central angle of 180°. The central angle and the number of arc-shaped surface-irregularity regions are not limited as long as rise and fall of the reflectance occur at least once per one disc rotation. In other words, the central angle of the arc may be of any value, and the number of the arc-shaped surface-irregularity region may be two or more as long as all irregularity regions are positioned at the same distance from the substrate center.

The surface-irregularity region is not limited to such an arc shape. Of the substrate surface, the area which is located opposite to the reflected light sensor in the course of disc rotation constitutes an annular region, and this annular region is concentric with the substrate. In the embodiment as described above, an surface-irregularity region of arc shape was formed in correspondence with this annular region. Change in the reflectance in synchronization with the disc rotation, however, can be realized irrespective of the particular shape of the surface-irregularity region as long as the surface-irregularity region is arranged to radially interrupt the annular region at least at one part thereof, and in other words, as long as the surface-irregularity region is arranged circumferentially adjacent to the smooth region.

The width (radial dimension) of the surface-irregularity region 2b is not particularly limited and may be determined depending on the location and type of the reflected light sensor used. In order to realize sufficient change in the reflectance, the width of the surface-irregularity region 2b is preferably at least 1 mm, and more preferably at least 2 mm. There is no particular upper limit for the width of the surface-irregularity region 2b, and the surface-irregularity region 2b may radially extend the full length of the non-recording region.

Preferably, the irregularity pattern in the surface-irregularity region comprises a plurality of regularly arranged grooves and/or projections. When the irregularity pattern has a configuration, dimension, and pitch equivalent to the groove or pit in the data recording region, change in the reflectance can be reliably detected by using a commercially available reflected light sensor comprising a combination of an LED and a PD. Provision of an irregularity pattern having a depth or height substantially equal to the groove depth or pit height in the data-recording region is also advantageous in the point as described below. When a resin substrate is produced by injection molding, a matrix pattern corresponding to the irregularity pattern including the grooves and the pits to be formed in the data recording region is formed in a template called stamper, and the stamper is placed in the mold cavity. Such provision of the stamper having formed therein the matrix pattern for the irregularity pattern enables simultaneous formation of the irregularity pattern with the injection molding of the disc. Since photolithography technology is used for the patterning of a stamper, further complication of the photolithography step can be avoided if the depth and/or the height of the irregularity pattern is designed to correspond to the groove and/or the pit of the data recording region.

The spot size on the substrate surface of the light emitted from the reflected light sensor is not particularly limited, and any adequate spot size may be adopted as long as the change in the reflectance at the surface-irregularity region 2b can be sufficiently detected and no adverse effects are induced in the data recording and reproduction.

Various commercially available optical sensors and photointerrupters comprising a combination of a light emitting diode (LED) and a photodiode (PD) can be used for the reflected light sensor.

Since the area in the exterior side of the data recording region in the optical recording disc is generally narrow in width, the surface-irregularity region is preferably provided in the interior side of the data recording region. However, the surface-irregularity region may be provided in the exterior side of the data recording region as desired.

The change in the reflectance at the surface-irregularity region is caused at the roughened substrate surface, and independent from the type of the recording layer. The present invention, therefore, can be applied not only to the phase change type optical recording discs but also to other types of rewritable optical recording discs. In addition, the change in the reflectance at the surface-irregularity region takes place even if the surface-irregularity region is not covered by the recording layer or any other layer (for example, the reflective layer), and the signal in synchronization with the disc rotation is also obtainable in such a case. However, in the case of the phase change type optical recording disc, coverage of the surface-irregularity region and the circumferentially adjacent smooth region by the crystallized recording layer is preferable since the smooth region will then have a higher reflectance and a greater difference in the reflectance will be realized between the surface-irregularity region and the smooth region to realize a higher resistance to disturbing noises (such as ambient light). When the optical recording has a reflective layer comprising a metal or the like, coverage of the surface-irregularity region and the circumferentially adjacent smooth region by the reflective layer will have an effect equivalent to the coverage by the crystallized recording layer. Coverage by both the crystallized recording layer and the reflective layer will have synergistic effect.

FIG. 2 shows an optical recording disc wherein the recording layer 4 is directly disposed on the surface of the substrate 2. The optical recording disc, however, may actually further comprise a dielectric layer between the substrate 2 and the recording layer 4; and a dielectric layer, a reflective layer, a resin protective layer and the like on the surface side of the recording layer 4. The optical recording disc may further have an optional protective plate adhered thereto comprising a resin plate similar to the substrate. Furthermore, the present invention is also applicable to an optical recording disc of double side-recording type wherein two discs each having the recording layer is adhered to each other. In the case of the optical recording disc of double side-recording type, the surface-irregularity region is provided on both sides of the disc.

Examples of the present invention are given below by way of illustration and not by way of limitation.

EXAMPLES

A disc shaped substrate having a diameter of 120 mm and a thickness of 0.6 mm was prepared by injection molding polycarbonate. In the injection molding of the substrate, a data recording region having a groove (having a width of 0.60 m, a depth of 50 nm, and a pitch of 1.20 m) and a surface-irregularity region on the radially inner side of the data recording region were simultaneously formed on one major surface of the substrate. The surface-irregularity region is of the constitution comprising a plurality of concentrically aligned grooves each extending in circumferential direction for 180°. The width in radial direction of the surface-irregularity region is 2 mm, and the width, depth and pitch of the groove is the same as those of the groove in the data recording region.

On one side of the substrate, there were formed on the whole surface a first dielectric layer comprising $ZnS-SiO_2$, a phase change-type recording layer having a composition of Ge—Sb—Te system, a second dielectric layer comprising $ZnS-SiO_2$, a reflective layer comprising Si, a third dielectric layer comprising $ZnS-SiO_2$, and a protective layer in this order to produce an optical recording disc sample.

A commercially available photointerrupter (focal length, 3 mm) comprising a combination of a light emitting diode and a photodiode was fixedly secured to the disc drive such that the distance between the light emitting section and the disc is 3 mm. The control system was reconstructed so that the track jump is conducted upon increase of the reflectance based on the output of the photointerrupter.

When the disc sample was placed in the disc drive after initializing the entire surface of the recording layer and land/groove recording was conducted, accurate track jump was realized and the recording could be completed with no overlapping along the entire track. When the entire track was continuously reproduced after the recording, accurate track jump was again realized.

As described above, the present invention is capable of producing the accurate track jump synchronization mark at low cost irrespective of the type of the recording layer.

Japanese Patent Application No. 108680/1998 is incorporated herein by reference.

Although some preferred embodiments have been described, many modifications and variations may be made thereto in the light of the above teachings. It is therefore to be understood that, within the scope of the appended claims, the invention may be practiced otherwise than as specifically described.

What is claimed is:

1. An optical recording disc comprising:
   a disc substrate;
   a recording layer on the disc substrate;
   a groove track and a land track adjacent to the groove track, said land and groove tracks located in a data recording region and configured to record data;
   at least one surface-irregularity region having an irregularity pattern formed on the disc substrate in a non-recording region with at least one of a groove and a pit,
   wherein said at least one surface-irregularity region is circumferentially adjacent to a smooth region.

2. An optical recording disc according to claim 1 wherein said surface-irregularity region is in the form of an arc which is concentric with the substrate.

3. An optical recording disc according to claim 1 wherein said irregularity pattern includes a plurality of circumferentially extending grooves.

4. An optical recording disc according to claim 1 wherein said irregularity pattern includes a plurality of projections.

5. An optical recording disc according to claim 1 wherein said surface-irregularity region has radial width of at least 1 mm.

6. An optical recording disc according to claim 1, wherein said disc substrate is formed with said at least one of a groove and pit in the data recording region and said surface-irregularity pattern has a depth or height substantially equal to said at least one of a groove and pit.

7. An optical recording disc according to claim 1 wherein said disc has a recording layer of phase change type, and wherein said recording layer in a crystalline state covers said surface-irregularity region and said smooth region.

8. An optical recording disc according to claim 1 wherein said disc has a reflective layer, and wherein said reflective layer covers said surface-irregularity region and said smooth region.

9. A method for obtaining synchronized signals on an optical recording disc, comprising the steps of:
   rotating said optical disc; and
   detecting, during rotation of said disc, a change in a light reflectance due to a difference in reflectivity between a region in a non-recording region of said optical recording disc with an irregularity pattern from a region in a non-recording region of said optical recording disc without said irregularity pattern;
   obtaining said synchronized signals from the change of light reflectance detected in the detecting step; and
   performing a track jump between land and groove tracks in synchronization with said change in light reflectance.

10. The method according to claim 9, wherein the step of detecting comprises detecting a change in light reflected from an arc located in said non-recording region and which is concentric with the disc substrate.

11. The method according to claim 9, wherein the step of detecting comprises detecting a change in light reflected from a plurality of circumferentially extending grooves located in said non-recording region.

12. The method according to claim 9, wherein the step of detecting comprises detecting a change in light reflected from a plurality of projections located in said non-recording region.

13. The method according to claim 9, wherein the step of detecting comprises detecting a change in light reflected from an irregularity pattern which has a radial width of at least 1 mm and which is located in said non-recording region.

14. The method according to claim 9, wherein the step of detecting comprises detecting a change in light reflected from an irregularity pattern which has a depth or height substantially equal to at least one of a groove and a pit and which is located in said non-recording region.

15. The method according to claim 9, wherein the step of detecting comprises detecting a change in light reflected from an irregularity pattern which has a recording layer in a crystalline state covering a smooth region and said irregularity pattern and which is located in said non-recording region.

16. The method according to claim 9, wherein the step of detecting comprises detecting a change in light reflected from an irregularity pattern which has a reflective layer covering a smooth region and said irregularity pattern and which is located in said non-recording region.

* * * * *